(12) United States Patent
Turi et al.

(10) Patent No.: US 11,452,402 B2
(45) Date of Patent: Sep. 27, 2022

(54) SUPPLY DEVICE FOR BEVERAGE-DISPENSING MACHINES

(71) Applicant: FRANKE KAFFEMASCHINEN AG, Aarburg (CH)

(72) Inventors: Mariano Turi, Zurich (CH); Heinz Vetterli, Wangen (CH)

(73) Assignee: Franke Kaffeemaschinen AG, Aarburg (CH)

(*) Notice: Subject to any disclaimer, the term of this patent is extended or adjusted under 35 U.S.C. 154(b) by 99 days.

(21) Appl. No.: 16/074,588

(22) PCT Filed: Jan. 12, 2017

(86) PCT No.: PCT/EP2017/050529
§ 371 (c)(1),
(2) Date: Aug. 1, 2018

(87) PCT Pub. No.: WO2017/137204
PCT Pub. Date: Aug. 17, 2017

(65) Prior Publication Data
US 2019/0038068 A1    Feb. 7, 2019

(30) Foreign Application Priority Data
Feb. 10, 2016 (DE) .......................... 102016102347.7

(51) Int. Cl.
*A47J 31/41* (2006.01)
*A47J 31/44* (2006.01)
(Continued)

(52) U.S. Cl.
CPC ........... *A47J 31/41* (2013.01); *A47J 31/4485* (2013.01); *A47J 2203/00* (2013.01);
(Continued)

(58) Field of Classification Search
CPC .... A47J 31/41; A47J 31/4485; A47J 2203/00; A47J 31/4489; A47J 31/525; A47J 31/56;
(Continued)

(56) References Cited

U.S. PATENT DOCUMENTS 2,098,210 A * 11/1937 Schulse .................... B67D 1/04
165/136
2,446,895 A * 8/1948 Weiss ................... B67D 1/0858
62/224
(Continued)

FOREIGN PATENT DOCUMENTS

CN         102342753      2/2012
DE        102012211270    1/2014
(Continued)

*Primary Examiner* — Tu B Hoang
*Assistant Examiner* — Diallo I Duniver
(74) *Attorney, Agent, or Firm* — Volpe Koenig

(57) ABSTRACT

A supply device for one or more beverage-dispensing machines (1a, 1b) is provided, having a holding space for the insertion of at least two storage containers (5a, 5b) for liquid foods, in particular milk, which storage containers can be connected to the one or more beverage-dispensing machines by food lines (4a, 4b, 4a', 4b'). The supply device (2) has a cooling device (10) for the temperature control of liquid foods contained in the storage containers to a specifiable target temperature. A thermally conductive, in particular metal, contact surface (8a, 8b) is provided for each of the food containers (5a, 5b), which contact surface is in thermally conductive contact with a thermally conductive outer wall (7a, 7b), in particular bottom surface, of the storage container in question when the storage container is installed, in order to cool the contents of the storage container. In addition, the thermally conductive contact surfaces can be cooled by the cooling device (10) by separately controllable cooling circuits (9a, 9b).

7 Claims, 2 Drawing Sheets

(51) Int. Cl.
  *B67D 1/08* (2006.01)
  *B67D 1/12* (2006.01)
(52) U.S. Cl.
  CPC .......... *B67D 1/0871* (2013.01); *B67D 1/0884* (2013.01); *B67D 1/12* (2013.01)
(58) Field of Classification Search
  CPC ...... B67D 1/0871; B67D 1/0884; B67D 1/12; B67D 1/0859
  USPC ................ 62/3.64, 3.7; 99/275, 277, 323.11, 99/323.6–323.9, 450.7–450.8, 452–453, 99/455–456, 470, 516–517, 280, 286, 99/293, 323.1; 222/129–145.8, 146.6, 1
  See application file for complete search history.

(56) References Cited

U.S. PATENT DOCUMENTS

| | | | | |
|---|---|---|---|---|
| 5,240,144 | A * | 8/1993 | Feldman | B67D 1/0001 222/105 |
| 5,363,671 | A * | 11/1994 | Forsythe | B67D 1/0864 222/146.6 |
| 5,564,601 | A * | 10/1996 | Cleland | B67D 1/0054 165/164 |
| 6,019,032 | A * | 2/2000 | Arksey | A47J 31/24 261/DIG. 16 |
| 2009/0031901 | A1 | 2/2009 | Peden et al. | |
| 2013/0115343 | A1* | 5/2013 | Reyhanloo | A47J 31/4485 426/231 |
| 2015/0315007 | A1* | 11/2015 | Wongsa | F25D 31/003 222/146.6 |
| 2016/0000259 | A1* | 1/2016 | Studor | B01F 3/04248 99/323.1 |

FOREIGN PATENT DOCUMENTS

| | | |
|---|---|---|
| EP | 2020198 | 2/2009 |
| EP | 2386229 | 11/2011 |
| JP | 2003262446 | 9/2003 |
| JP | 2009034502 | 2/2009 |
| JP | 2009078090 | 4/2009 |
| JP | 2014043957 | 3/2014 |

* cited by examiner

SUPPLY DEVICE FOR BEVERAGE-DISPENSING MACHINES

BACKGROUND

The present invention relates to a supply device for one or more beverage-dispensing machines, which supply device serves for storing, controlling the temperature of and supplying a liquid foodstuff which can be dispensed via the beverage-dispensing machine or the beverage-dispensing machines.

In the case of beverage-dispensing machines for dispensing hot or cold beverages, liquid foodstuffs which have to be stored in cooled form are frequently dispensed or added. This applies in particular in the case of fully automatic coffee machines which, in addition to freshly brewed coffee beverages, also dispense milk or milk-containing beverages. For example, in the case of a cappuccino or latte macchiato, frothed milk is added to the freshly brewed coffee. The milk has to be stored in this case in a cooling chamber so that the milk does not spoil. On the other hand, the milk temperature is of crucial importance especially during the production of milk froth. Even slight deviations from the ideal milk temperature lead to a deterioration in the milk froth consistency.

In particular in the case of fully automatic coffee machines, it is known to store the milk in a separate cooling unit in the form of a supply device. Especially in the professional sector, a plurality of fully automatic coffee machines are frequently operated in parallel. It is advantageous here to provide a common supply device for the storage and cooling of the milk.

In the case of conventional cooling units or in the case of refrigerators of known type, the product to be cooled is cooled by cooling of the refrigerator interior. Heat is transported here especially by convection via the air volume between the cooled refrigerator walls and the product to be cooled which is stored in the refrigerator.

If a common cooling unit is used as a supply device for a plurality of beverage-dispensing machines, a separate storage container should be kept in the cooling chamber of the cooling unit for each beverage-dispensing machine. If a storage container is empty, it has to be filled or replaced by a fresh storage container (e.g. a new milk carton). The temperature of the filled or freshly inserted liquid foodstuff is only adjusted slowly here to the temperature of the refrigerator. Some time therefore passes before the fresh foodstuff has reached the desired temperature.

Alternatively, the cooling power of the cooling unit could be increased in a cool-down phase. However, in this case, the other foodstuff containers would likewise be more greatly cooled down, and therefore the foodstuff temperature in them may drop below the desired temperature and, in an extreme case, the liquid foodstuff could even freeze.

SUMMARY

The present invention has therefore been set the object of specifying a supply device of the type mentioned at the beginning for two or more storage containers, in which the temperature of liquid foodstuffs in the separate storage containers can be adjusted more rapidly to a desired temperature.

The object is achieved using one or more features of the invention. Advantageous embodiments can be gathered from description and claims that follow.

A supply device according to the invention comprises a receiving compartment for the insertion of at least two storage containers for liquid foodstuffs, in particular milk, which storage containers are connectable to one or more beverage-dispensing machines via foodstuff lines. The supply device has a cooling device for control of the temperature of liquid foodstuffs, which are located in the storage containers, to a predeterminable desired temperature. For each of the foodstuff containers, a heat-conducting, in particular metallic contact surface is provided which, when the storage container is inserted, is in heat-conducting contact with a heat-conducting outer wall, in particular bottom surface, of the relevant storage container in order to cool the contents of the storage container. In addition, the heat-conducting contact surfaces are coolable here by the cooling device via cooling circuits which are each controllable separately.

According to the invention, the liquid foodstuffs are therefore not cooled via convection, but rather via heat conduction (conduction) by direct contact between the heat-conducting outer wall of the storage container and the contact surface, which is cooled by the cooling device, in the cooling chamber. The heat conduction is particularly effective especially in the case of a metallic contact surface or metallic outer wall of the storage container. For reasons concerned with hygiene or foodstuff technology, stainless steel is preferred as the material for the outer wall of the storage container.

Furthermore, cooling circuits which are controllable separately are provided for the contact surfaces or cooling surfaces in the interior of the receiving compartment. The temperature in each of the storage containers can therefore be controlled separately and independently of the temperature in the remaining storage containers, and the cooling power for the respective contact surface can be correspondingly adapted.

In addition, each of the heat-conducting contact surfaces can preferably be provided with a temperature sensor for determining the actual temperature in the associated foodstuff container. This makes it possible in a simple manner to control the cooling power supplied by the cooling device via the contact surface. Alternatively, the temperature of the liquid foodstuff could also be measured directly, for example by a temperature sensor in the foodstuff line leading away from the storage container. Since, however, the heat adjustment between contact surface and the liquid foodstuff by the heat conduction via the outer wall of the storage container takes place very rapidly and efficiently, a temperature sensor on the contact surface permits a sufficiently precise determination of the actual temperature and control of the cooling power without the temperature sensor itself having to be brought into contact with the liquid foodstuff. An arrangement of this type can therefore be cleaned substantially more hygienically and simply than a temperature sensor which is in direct contact with the liquid foodstuff.

In a preferred embodiment, the cooling device can be designed in a manner known per se as a compression refrigeration machine. It is advantageous here to provide a common compressor for the separate cooling circuits and separate evaporators in each of the separate cooling circuits. Separate control of the cooling circuits can take place here, for example, via valves, via which a cooling circuit in which cooling is not specifically intended to take place can be separated from the compressor or, alternatively, the cooling power can be reduced by throttling the supply of coolant.

In a further advantageous embodiment, a control device is also provided which is connected to a corresponding control unit of the one or more beverage-dispensing machines, and which transmits a signal for blocking a product for as long as a product temperature deviating from a predeterminable desired temperature prevails in an associated storage container, and/or if a product quantity remaining in the storage container falls below a predeterminable minimum quantity, the storage container is empty or the liquid foodstuff at least threatens to start to run out.

At the associated beverage-dispensing machine, a signal can therefore be output to an operator to top up the liquid foodstuff. For as long as freshly topped-up liquid foodstuff has not reached the predetermined desired temperature, the product reference can also be blocked. This is expedient, for example, if milk froth is intended to be dispensed, but the milk has not yet reached the temperature necessary for producing milk froth. This avoids milk froth of lower quality or consistency being dispensed because the milk temperature is too high during the frothing operation.

In addition, it is provided within the context of the present invention that the supply device is provided with a display device, on which actual temperature values measured on the respective contact surfaces can be displayed.

In a further embodiment, for each of the storage containers, a pump can be provided for conveying the liquid foodstuff. In addition, holding elements and/or press-on elements can be provided in order to hold the storage containers against their associated contact surfaces. In addition, the receiving compartment can be divided into individual receiving compartments by partitions.

BRIEF DESCRIPTION OF THE DRAWINGS

Further preferred features and embodiments will be explained below with reference to exemplary embodiments and the figures, in which.

DETAILED DESCRIPTION

Figure 1:
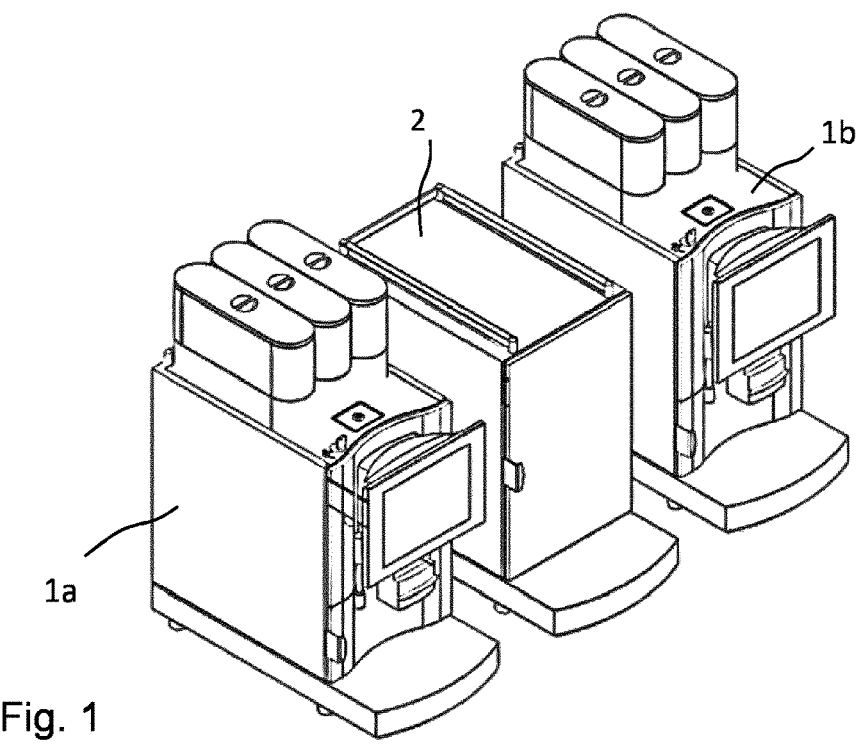
FIG. 1 shows two fully automatic coffee machines with a common cooling unit in the form of a supply device.

FIG. 1 shows by way of example two fully automatic coffee machines 1a, 1b and a third unit 2 in the form of a supply device erected in between. The supply device 2 is a cooling unit which serves for storing cooled milk for the preparation of coffee or milk beverages with hot or cold milk or milk froth. For this purpose, the cooling unit 2 contains a corresponding dispensing device for milk products. The supply device is erected centrally between two coffee machines. Alternatively, of course, the supply device may also be designed as an under counter unit, i.e. a unit under the counter or in spatial vicinity in some other way to the fully automatic coffee machines is also intended to be understood as the supply device within the context according to the invention.

The supply device 2 is electronically controlled and cooperates with the controller of the two fully automatic coffee machines 1a, 1b. For example, a temperature display and adjustment in the cooling temperature of the cooling unit can take place via the display of the fully automatic coffee machines 1a, 1b. Similarly, the empty message, blocking of a product if there is a lack of milk, and a residual quantity reference of milk/milk coffee products after the empty message to the connected coffee machines 1a, 1b can be programmed. In addition, a request to the controller of the supply device is sent from a fully automatic coffee machine if milk is intended to be dispensed. The supply device reacts to such a request by conveying milk by an integrated milk pump via a milk line to the relevant fully automatic coffee machine.

Figure 2:
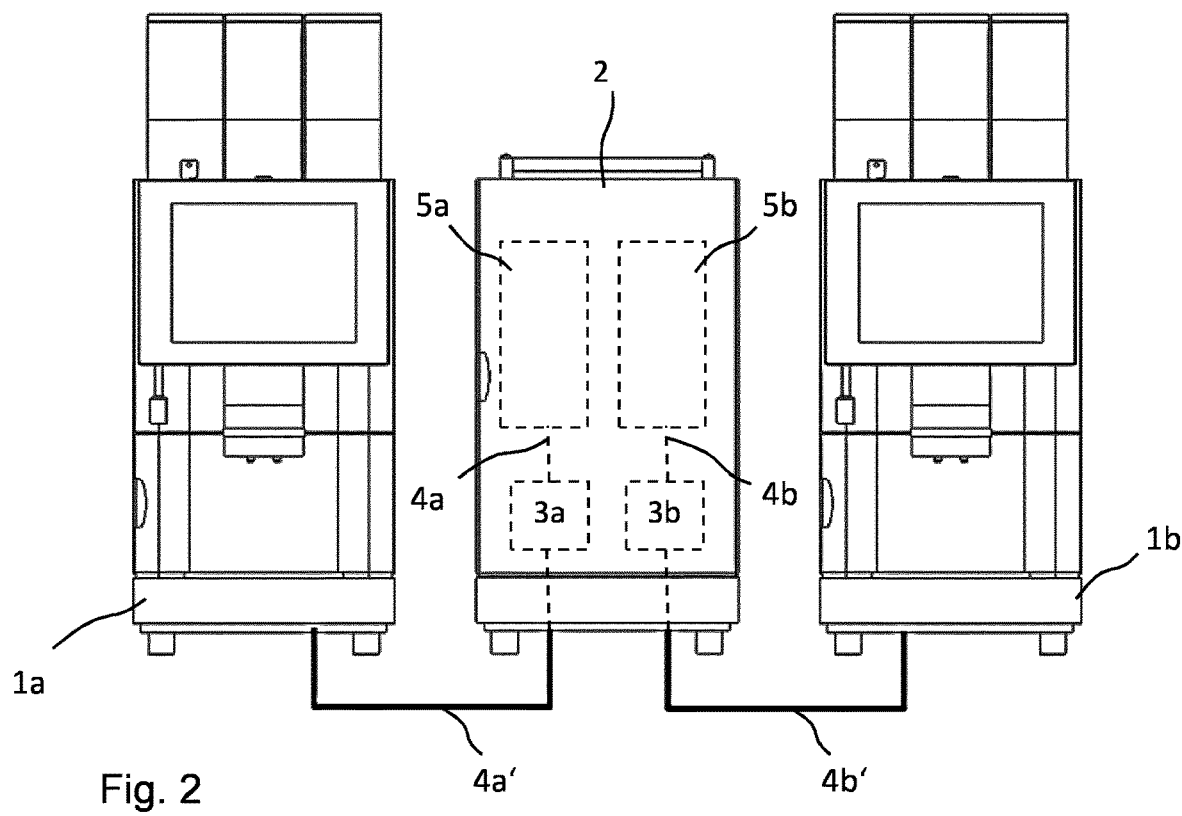
FIG. 2 shows a top view of the fully automatic coffee machines and the supply device from FIG. 1 with milk containers and milk lines shown schematically.

FIG. 2 shows a view of the fully automatic coffee machines 1a, 1b and of the supply device 2. The supply device 2 contains two high-power milk pumps 3a, 3b with which milk can be conveyed from in each case one milk container 5a, 5b via corresponding milk lines 4a, 4b, 4a', 4b' to the two fully automatic coffee machines 1a, 1b. The milk lines 4a, 4b each lead from the milk containers 5a, 5b to the two milk pumps 3a, 3b and on from there as external lines 4a', 4b' to the two fully automatic coffee machines 1a, 1b.

Figure 3:
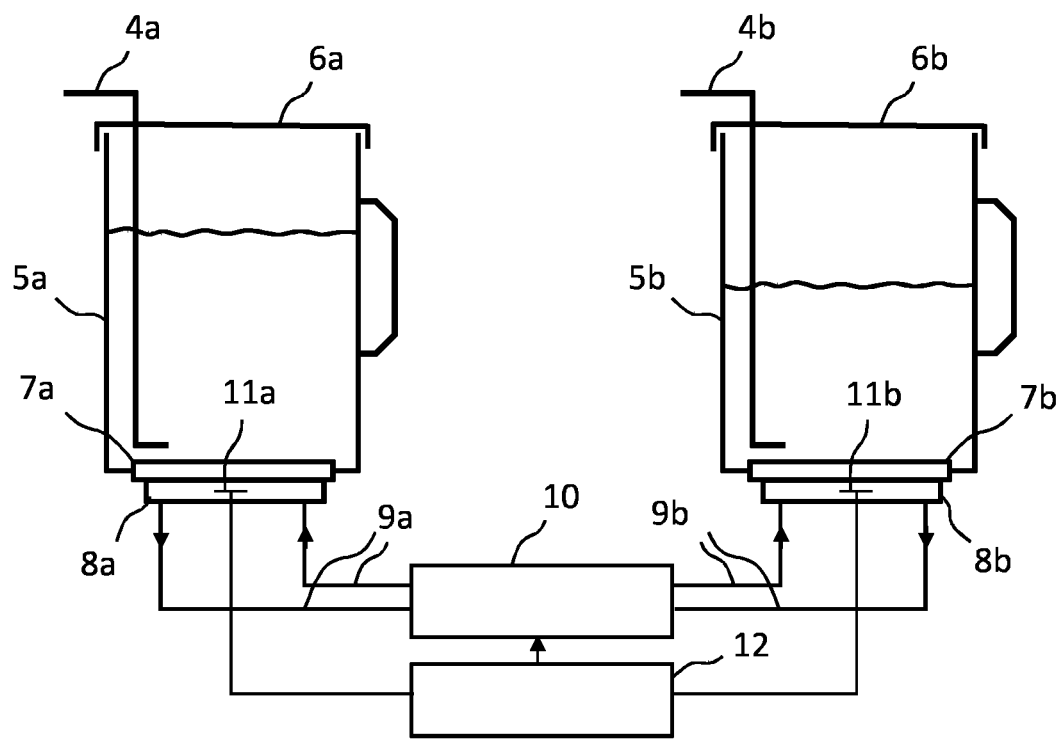
FIG. 3 shows two storage containers which are inserted in the interior of the supply device and have bottom-side contact or cooling surfaces and separate cooling circuits in each case.

FIG. 3 shows the "inner workings" of the supply device 2 schematically. Two milk containers 5a, 5b can be inserted in the receiving compartment of the supply device. In the exemplary embodiment, the milk containers 5a, 5b are designed as containers which are open upward and are each provided with a cover 6a, 6b. The milk containers in FIG. 3 are filled with milk to a different filling level. The suction line 4a, 4b leads in each case through the cover 6a, 6b into the milk containers 5a, 5b, via which suction line milk is sucked up by the associated milk pump 3a, 3b and conveyed to the connected fully automatic coffee machine. The milk containers 5a, 5b can be taken out of the supply device 2 for filling and can be placed, for example, into a dishwasher for cleaning.

The bottom 7a, 7b of the milk containers 5a, 5b is designed in each case as a heat-conducting outer wall and, for this purpose and for hygienic reasons, is comprised of stainless steel. In addition, the bottom region 7a, 7b can be of reinforced design and, in order to improve the heat conductivity, can additionally have a core of highly heat-conductive material, for example copper. By contrast, the remaining region of the milk containers 5a, 5b can be comprised of plastic in a conventional manner. Of course, the entire milk container 5a, 5b can also be produced from stainless steel.

The milk containers 5a, 5b each stand on a heat-conducting contact plate 8a, 8b. The contact plates 8a, 8b are cooled by a cooling device 10, for example a compression refrigeration machine, via separate cooling circuits 9a, 9b. The contact plates 8a, 8b can be comprised of stainless steel or another heat-conducting metal in the same manner as the bottom of the milk containers 5a, 5b. A temperature sensor 11a, 11b is arranged in each case on the two contact plates 8a, 8b, and the temperature sensors 11a, 11b are connected to a control device 12 in terms of signals. Depending on the temperature measured by the temperature sensors 11a, 11b, the control device 12 controls the cooling device 10 in such a manner that the two contact plates are cooled to the preset desired temperature via the respective cooling circuits 9a, 9b. The heat-conducting bottom 7a, 7b of the milk containers 5a, 5b is adapted in size and shape to the contact plates 8a, 8b such that a good heat transition is ensured. In the exemplary embodiment, the bottom surface 7a, 7b of the milk containers 5a, 5b is slightly larger than the standing surface of the contact plates 8a, 8b such that sufficient contact between bottom and standing surface is always ensured.

Figure 4:
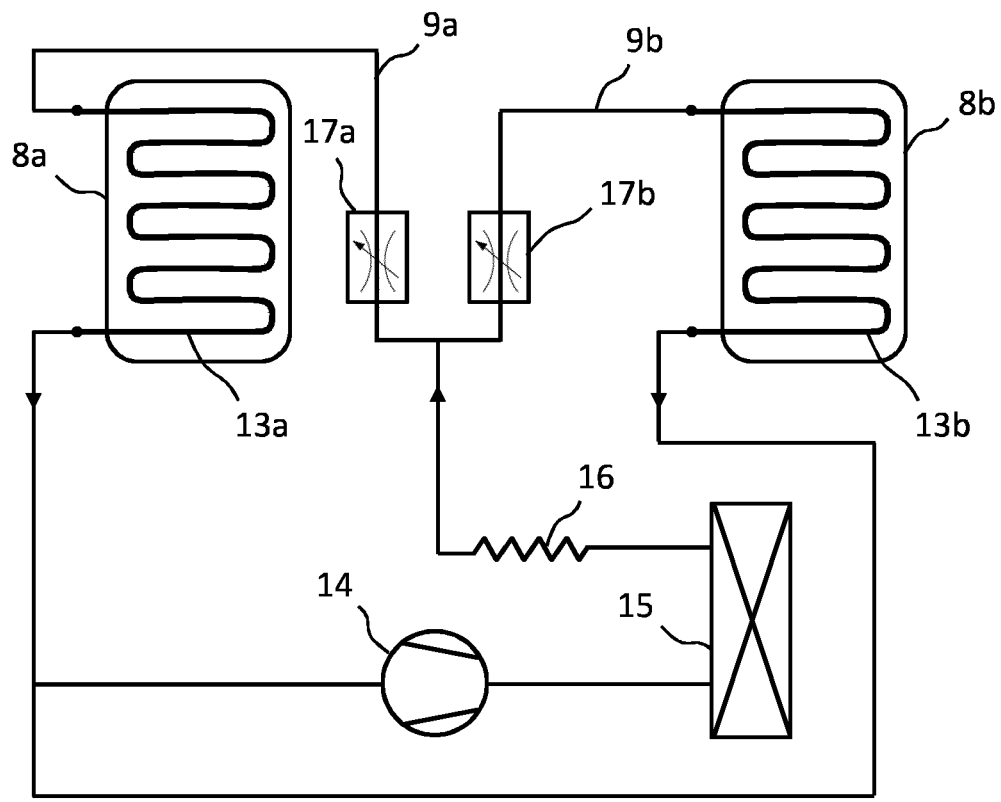
FIG. 4 shows a schematic fluid diagram of a cooling device for a supply device according to the invention.

FIG. 4 shows a flow diagram of the cooling circuit. The contact plates 8a, 8b are each provided with cooling coils 13a, 13b. The latter can either be integrated in the interior of the contact plates 8a, 8b or fastened to the underside of the contact plates 8a, 8b. For example, the cooling coils 13a, 13b can be soldered onto the underside of the contact plates 8a, 8b. The cooling coils 13a, 13b serve as evaporators in the coolant circuit and are cooled by the coolant which circulates in the cooling circuit and evaporates on passing through the cooling coils 13a, 13b.

The cooling coils 13a, 13b are connected via corresponding coolant lines to a compressor 14 which compresses the gaseous cooling medium and conducts same through a condenser 15. The coolant is condensed there with heat being output. The output heat is removed, for example, via cooling fins on the rear side of the supply device 2. The coolant which is liquefied in the condenser 15 is then expanded via a throttle 16, for example a capillary tube. Downstream of the throttle 16, the coolant line branches to the two coolant circuits 9a, 9b. Each of the cooling circuits 9a, 9b is provided with a valve 17a, 17b with which the relevant cooling circuit 9a, 9b can be shut off.

The valves 17a, 17b can be designed here either as pure closing valves or, as shown in FIG. 4, as throttle valves. In the latter case, not only can the relevant cooling circuit 9a, 9b be blocked, but the coolant quantity can also be regulated. The valves 17a, 17b are activated via the control unit 12 which is shown in FIG. 3 and also switches on the compressor 14 when required. The cooling power for the contact plates 8a, 8b can therefore be controlled separately. It is likewise possible to design the valves 17a, 17b as a common directional control valve with which one of the two cooling circuits can be selectively switched on or cut off.

As already mentioned, the control takes place via the control unit 12 and temperature sensors 11a, 11b on the contact plates 8a, 8b. The temperature sensors used can be, for example, temperature-dependent resistance elements, such as, for example, NTC or PTC elements or else semiconductor temperature sensors.

Of course, instead of a common compressor for the separate cooling circuits, a separate compressor can be provided for each of the cooling circuits. It is likewise possible to provide a common condenser for the two cooling circuits or separate condensers per cooling circuit.

In addition to a compression refrigerator as shown in the exemplary embodiment, the cooling device 10 can also be realized by an absorption refrigerator of a design known per se. It is likewise possible to realize the cooling device 10 by Peltier elements which operate according to the thermoelectric principle.

For good heat transfer between the contact plates 8a, 8b in the interior of the cooling chamber of the supply device 2 and the bottom region 7a, 7b of the milk containers 5a, 5b, said contact plates are adapted to each other in shape and size. In addition, holding elements, guide rails or the like can be provided in order to hold and to lock the milk containers 5a, 5b in their predetermined position in relation to the contact plates 8a, 8b. Furthermore, press-on elements, such as clamps, springs or the like, can be used to hold the milk containers 5a, 5b under prestress against the contact plates 8a, 8b.

In the exemplary embodiment, the heat coupling between cooling surface and storage container takes place via the bottom surface of the container. However, it would likewise be readily conceivable for the heat dissipation to take place via a side wall of the container. For this purpose, a corresponding heat-conducting contact surface for the storage container would merely have to be provided at a suitable point in the cooling chamber and the outer wall of the storage container that faces the contact surface would have to be designed as a heat transfer region.

The control device 12 can be designed in a manner known per se with one or more correspondingly programmed microprocessors and communicate with control devices of the connected fully automatic coffee machines via a communication interface.

The milk containers 5a, 5b can additionally be equipped with level sensors such that, in addition to the temperature in the milk container, the level can also be transmitted to the connected fully automatic coffee machines via the control device 12.

The invention claimed is:

1. A system including at least two automatic coffee-dispensing machines (1a, 1b) and a supply device for the at least two automatic coffee-dispensing machines (1a, 1b), the supply device comprising:
   a receiving compartment adapted for insertion of at least two milk storage containers (5a, 5b), the milk storage containers are connectable to the at least two beverage automatic coffee-dispensing machines (1a, 1b) via foodstuff lines (4a, 4b, 4a', 4b'),
   a cooling device (10) for controlling a temperature of milk, placed in the milk storage containers (5a, 5b), to a predeterminable temperature,
   a separate heat-conducting contact plate having a cooling coil and a separate heat-conducting contact surface (8a, 8b) for each of the milk storage containers which, when a respective one of the milk storage containers (5a, 5b) is inserted, the separate heat-conducting contact surface physically contacts a heat-conducting bottom wall (7a, 7b) of the respective milk storage container with the separate heat-conducting contact surface (8a, 8b) being smaller than the respective heat-conducting bottom wall (7a, 7b) to provide a heat-conducting contact, and to cool the contents of the milk storage container (5a, 5b) via the cooling coil;
   a separately controllable cooling circuit (9a, 9b) of the cooling device (10) that cools each of the separate heat-conducting contact surfaces (8a, 8b) to provide selective cooling for each of the milk storage containers (5a, 5b);
   each of the separate heat-conducting contact surfaces (8a, 8b) is provided with a temperature sensor (11a, 11b) for determining an actual temperature at the heat-conducting bottom wall (7a, 7b) of each respective one of the milk storage containers (5a, 5b), and a cooling power supplied by the cooling device (10) to each of the separate heat-conducting contact surface (8a, 8b) is controlled via a control unit (12) based on said temperature sensors (11a, 11b); and
   the control unit (12) is connectable to the at least two automatic coffee-dispensing machines and is configured to send a signal for blocking a product delivery for as long as the actual temperature deviates from a predeterminable desired temperature for each of the milk storage containers (5a, 5b).

2. The system as claimed in claim 1, wherein the cooling device (10) has a common compressor (14) for the seperately controllable cooling circuits (9a, 9b) and separate evaporators (13a, 13b) in the seperately controllable cooling circuits (9a, 9b).

3. The system as claimed in claim 1, wherein the supply device further comprises a display device, on which actual temperature values measured on the respective heat-conducting contact surfaces (8*a*, 8*b*) are displayable.

4. The system as claimed in claim 1, wherein the supply device further comprises, for each of the milk storage containers (5*a*, 5*b*), a pump (3*a*, 3*b*) for conveying the milk.

5. The system as claimed in claim 1, wherein the supply device further comprises at least one of holding elements or press-on elements that hold the milk storage containers (5*a*, 5*b*) against the associated heat-conducting contact surfaces (8*a*, 8*b*).

6. The system as claimed in claim 1, wherein the supply device further comprises valves (17*a*, 17*b*) for each of the seperately controllable cooling circuits (9*a*, 9*b*) that allow separate control of the cooling power supplied to the separate heat-conducting contact surfaces (8*a*, 8*b*).

7. The system as claimed in claim 1, wherein the separate heat-conducting contact surface (8*a*, 8*b*) for each of the milk storage containers (5*a*, 5*b*) has an attached or integral cooling coil that carries a cooling fluid.

\* \* \* \* \*